(12) United States Patent
Manoukian (10) Patent No.: US 11,668,250 B2
(45) Date of Patent: Jun. 6, 2023

(54) SYSTEM AND METHOD FOR ENGINE OPERATION IN A MULTI-ENGINE AIRCRAFT

(71) Applicant: PRATT & WHITNEY CANADA CORP., Longueuil (CA)

(72) Inventor: Patrick Manoukian, Saint-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 253 days.

(21) Appl. No.: 16/679,901

(22) Filed: Nov. 11, 2019

(65) Prior Publication Data
US 2021/0140374 A1 May 13, 2021

(51) Int. Cl.
*F02C 9/18* (2006.01)
*B64D 31/00* (2006.01)
*G05B 11/28* (2006.01)

(52) U.S. Cl.
CPC .............. *F02C 9/18* (2013.01); *B64D 31/00* (2013.01); *G05B 11/28* (2013.01); *F05D 2260/606* (2013.01); *F05D 2270/52* (2013.01)

(58) Field of Classification Search
CPC .. F01D 19/02; F01D 19/00; F01C 7/26; F02C 7/262; F02C 7/27; B64D 31/00; G05B 11/28; F05D 2260/606; F05D 2270/52
See application file for complete search history.

(56) References Cited

U.S. PATENT DOCUMENTS

| | | | |
|---|---|---|---|
| 10,221,774 B2 | 3/2019 | Gelwan et al. | |
| 10,384,791 B2 | 8/2019 | Gelwan et al. | |
| 2011/0002774 A1* | 1/2011 | Karafillis | F04D 29/162 |
| | | | 415/118 |
| 2013/0192252 A1* | 8/2013 | Ackermann | F02C 7/185 |
| | | | 60/785 |
| 2018/0023413 A1 | 1/2018 | Chowdhury et al. | |
| 2020/0025019 A1* | 1/2020 | Feulner | F01D 11/20 |
| 2020/0332725 A1* | 10/2020 | Smith | F04D 27/0223 |
| 2021/0054782 A1* | 2/2021 | Kupratis | F01D 13/003 |

OTHER PUBLICATIONS

Zhonglin Lin, Tianhong Zhang, Intelligent real-time pressure tracking system using a novel hybrid control scheme, Transactions of the Institute of Measurement and Control ■ Oct. 2017 (Year: 2017).*

* cited by examiner

Primary Examiner — Todd E Manahan
Assistant Examiner — Rodolphe Andre Chabreyrie
(74) Attorney, Agent, or Firm — Norton Rose Fulbright Canada LLP (57) ABSTRACT

Methods and systems for operating a gas turbine engine in a multi-engine aircraft are described. The method comprises operating the gas turbine engine in a standby mode to provide substantially no motive power to the aircraft when another engine of the multi-engine aircraft is operated in an active mode to provide motive power to the aircraft, transitioning the gas turbine engine from the standby mode to the non-standby mode, and applying pulse width modulation to an air switching system of the gas turbine engine while transitioning the gas turbine engine from the standby mode to the non-standby mode.

12 Claims, 9 Drawing Sheets

SYSTEM AND METHOD FOR ENGINE OPERATION IN A MULTI-ENGINE AIRCRAFT

TECHNICAL FIELD

The present disclosure relates generally to engine operation in a multi-engine aircraft, and more particularly to exiting a mode of operation for engines of an aircraft where the engines are operating asymmetrically.

BACKGROUND OF THE ART

When operating aircraft with multiple engines, there may be certain portions of a mission that do not require both engines to be operating at full regime. In cruising conditions, operating a single engine at a relatively high regime, instead of both engines at lower regimes, may allow for better fuel efficiency.

Improvements are needed for managing the various engine operating regimes.

SUMMARY

In accordance with a broad aspect, there is provided a method for operating a gas turbine engine in a multi-engine aircraft. The method comprises operating the gas turbine engine in a standby mode to provide substantially no motive power to the aircraft when another engine of the multi-engine aircraft is operated in an active mode to provide motive power to the aircraft, transitioning the gas turbine engine from the standby mode to the non-standby mode, and applying pulse width modulation to an air switching system of the gas turbine engine while transitioning the gas turbine engine from the standby mode to the non-standby mode.

In accordance with another broad aspect, there is provided a system for operating a gas turbine engine in a multi-engine aircraft. The system comprises a processing unit and a non-transitory storage medium having stored thereon program code. The program code is executable by the processing unit for operating the gas turbine engine in a standby mode to provide substantially no motive power to the aircraft when another engine of the multi-engine aircraft is operated in an active mode to provide motive power to the aircraft, transitioning the gas turbine engine from the standby mode to the non-standby mode, and applying pulse width modulation to an air switching system of the gas turbine engine while transitioning the gas turbine engine from the standby mode to the non-standby mode.

In accordance with yet another a broad aspect, there is provided a method of operating a multi-engine aircraft having two or more gas turbine engines. The method comprises operating a first engine of the gas turbine engines in an active mode to provide motive power to the aircraft, operating a second engine of the gas turbine engines in a standby mode to provide substantially no motive power to the aircraft, transitioning the second engine out of the standby mode to a non-standby mode, and applying pulse width modulation to an air switching system of the second engine while transitioning from the standby mode to the active mode.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1A:
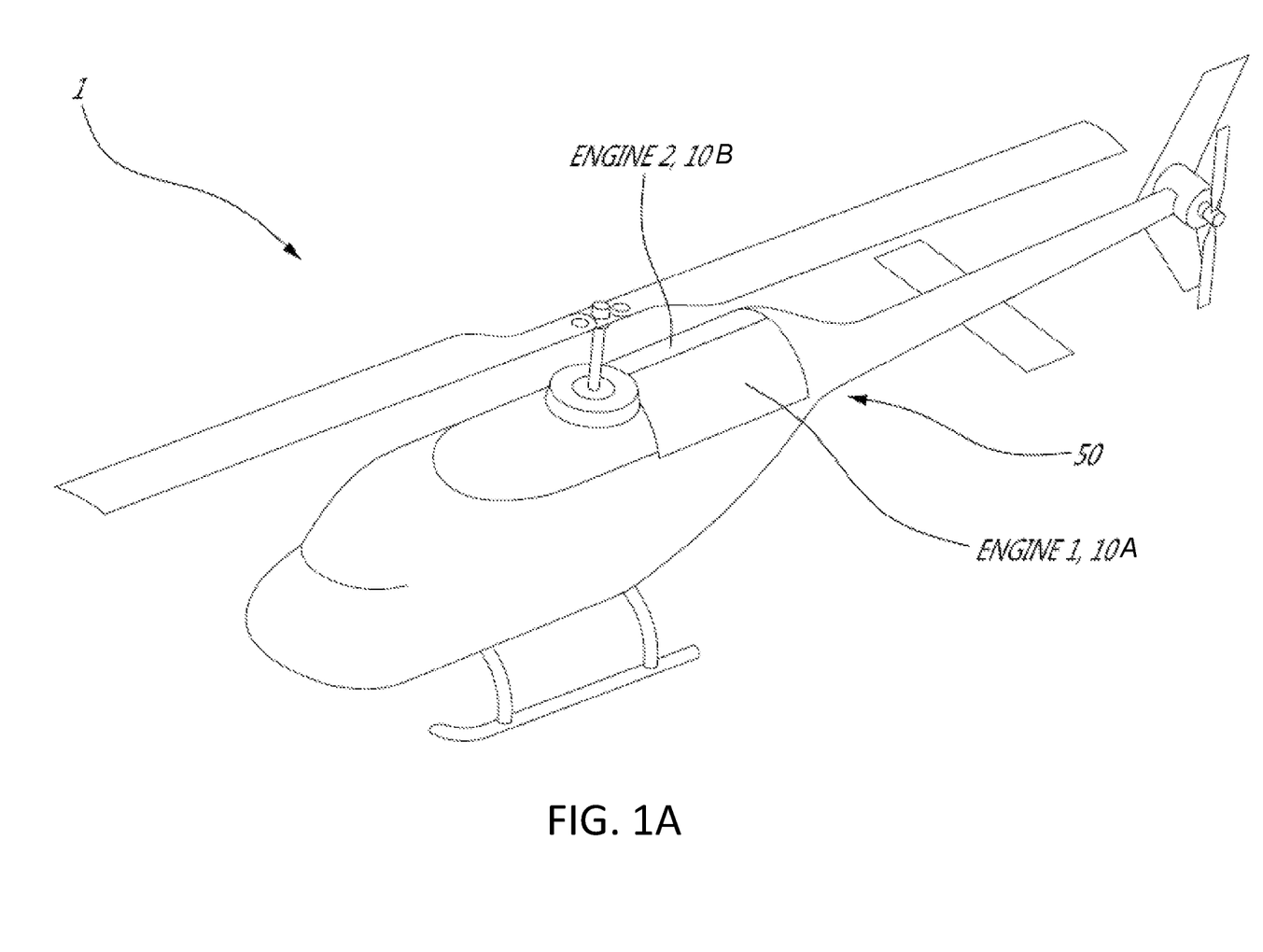
FIG. 1A is a schematic view of an exemplary multi-engine aircraft.

FIG. 1A depicts an exemplary multi-engine aircraft 1, which in this case is a helicopter. The aircraft 1 may however also be a fixed-wing aircraft. The aircraft 1 includes at least two gas turbine engines 10A, 10B, labeled in FIG. 1A as "ENGINE 1" and "ENGINE 2", respectively. These two engines may be interconnected, in the case of the depicted helicopter application, by a common gearbox to form a multi-engine system 50 as shown in FIG. 1B.

Figure 1B:
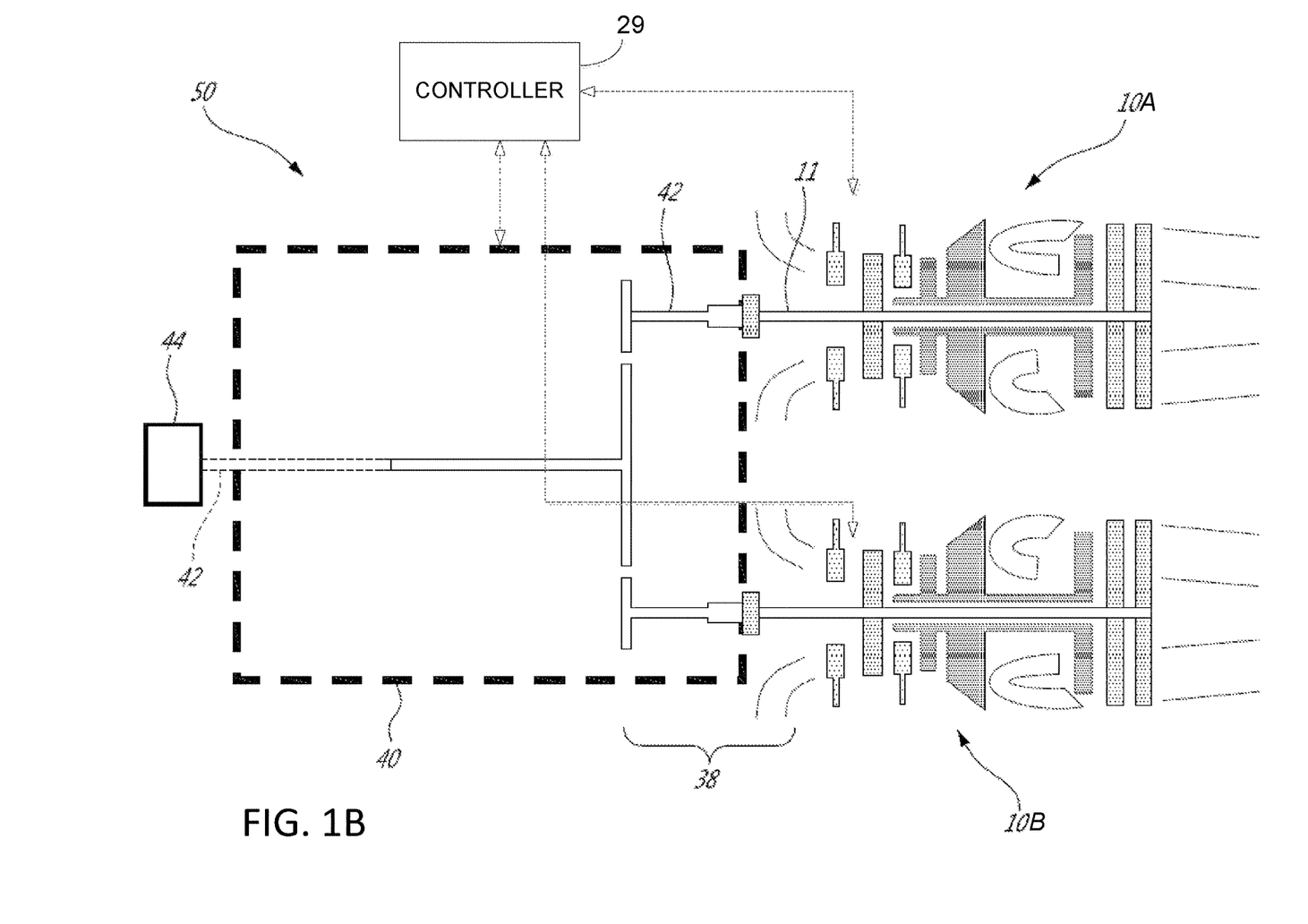
FIG. 1B is a schematic representation of an exemplary multi-engine system for the aircraft of FIG. 1A, showing axial cross-sectional views of two gas turbine engines.

FIG. 1B illustrates a schematic representation of an exemplary multi-engine system 50 that may be used as a power plant for the aircraft 1. The multi-engine system 50 comprises two or more gas turbine engines 10A, 10B. The multi-engine system 50 may manage the operation of the engines 10A, 10B, as will be described in further detail below. The multi-engine system 50 may be used as a dual engine power plant for an aircraft, such as a helicopter. In addition to airborne applications, the multi-engine system 50 may be used in marine and/or industrial applications.

More particularly, the multi-engine system 50 of this embodiment includes first and second engines 10A, 10B each having a respective transmission 38 which are interconnected by a common output gearbox 40 to drive a common load 44. In one embodiment, the common load 44 may comprise a rotary wing of a rotary-wing aircraft. For example, the common load 44 may be a main rotor of a helicopter. Depending on the type of the common load 44 and on the operating speed thereof, each of engines 10A, 10B may be drivingly coupled to the common load 44 via the output gearbox 40, which may be of the speed-reduction type.

For example, the gear box 40 may have a plurality of transmission shafts 42 to receive mechanical energy from respective output shafts 11 of respective engines 10A, 10B. The gear box 40 may be configured to direct at least some of the combined mechanical energy from the plurality of the engines 10A, 10B toward a common output shaft 42 for driving the common load 44 at a suitable operating (e.g., rotational) speed. It is understood that the multi-engine system 50 may also be configured, for example, to drive accessories and/or other elements of an associated aircraft 1. As will be described, the gear box 40 may be configured to permit the common load 44 to be driven by either of the engines 10A, 10B or, by a combination of both engines 10A, 10B together.

Control of the multi-engine system 50 is effected by one or more controller(s) 29, which may be FADEC(s), electronic engine controller(s) (EEC(s)), electronic control units (s) (ECU(s)) or the like, that are programmed to manage, as described herein below, the operation of the engines 10A, 10B to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the multi-engine system 50. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, the engines 10A, 10B of the system 50 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a lower-power (which could be no power, in some cases) "standby mode" while the other engine is operated in a high-power "active" mode. Such an asymmetric operating regime is engaged for a cruise phase of flight (continuous, steady-state flight which is typically at a given commanded constant aircraft cruising speed and altitude). The multi-engine system 50 may be used in an aircraft, such as a helicopter, but also has applications in suitable marine and/or industrial applications or other ground operations.

Referring still to FIG. 1B, according to the present description the multi-engine system 50 is driving in this example an aircraft 1 which may be operated in this asymmetric manner, in which a first of the turboshaft engines (say, 10A) may be operated at high power in an active mode and the second of the turboshaft engines (10B in this example) may be operated in a lower-power (which could be no power, in some cases) standby mode. In one example, the first turboshaft engine 10A may be controlled by the controller(s) 29 to run at full (or near-full) power conditions in the active mode, to supply substantially all or all of a required power and/or speed demand of the common load 44. The second turboshaft engine 10B may be controlled by the controller(s) 29 to operate at lower-power or no-output-power conditions to supply substantially none or none of a required power and/or speed demand of the common load 44. Optionally, a clutch may be provided to declutch the low-power engine. Controller(s) 29 may control the engine's governing on power according to an appropriate schedule or control regime. The controller(s) 29 may comprise a first controller for controlling the first engine 10A and a second controller for controlling the second engine 10B. The first controller and the second controller may be in communication with each other in order to implement the operations described herein. In some embodiments, a single controller 29 may be used for controlling the first engine 10A and the second engine 10B.

In another example, an asymmetric operating regime of the engines may be achieved through the one or more controller's 29 differential control of fuel flow to the engines, as described in pending application Ser. No. 16/535,256, the entire contents of which are incorporated herein by reference. Low fuel flow may also include zero fuel flow in some examples.

Although various differential control between the engines of the engine system 50 are possible, in one particular embodiment the controller(s) 29 may correspondingly control fuel flow rate to each engine 10A, 10B accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric operating regime, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 29 may operate one engine (say 10B) of the multiengine system 50 in a standby mode at a power substantially lower than a rated cruise power level of the engine, and in some embodiments at substantially zero output power and in other embodiments less than 10% output power relative to a reference power (provided at a reference fuel flow). Alternately still, in some embodiments, the controller(s) 29 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 50 of FIG. 1B may be operated in an asymmetric operating regime by control of the relative speed of the engines using controller(s) 29, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines 10A, 10B, the asymmetric operating regime is applicable to more than two engines, whereby at least one of the multiple engines is operated in a low-power standby mode while the remaining engines are operated in the active mode to supply all or substantially all of a required power and/or speed demand of a common load.

In use, the first engine (say 10A) may operate in the active mode while the other engine (say 10B) may operate in the standby mode, as described above. During operation in the asymmetric operating regime, if the aircraft 1 needs a power increase (expected or otherwise), the second engine 10B may be required to provide more power relative to the low power conditions of the standby mode, and possibly return immediately to a high- or full-power condition. This may occur, for example, in an emergency condition of the multi-engine system 50 powering the helicopter, wherein the "active" engine loses power and power recovery from the lower power to the high power may take some time. Even absent an emergency, it will be desirable to repower the standby engine to exit the asymmetric operating regime.

Figure 2:
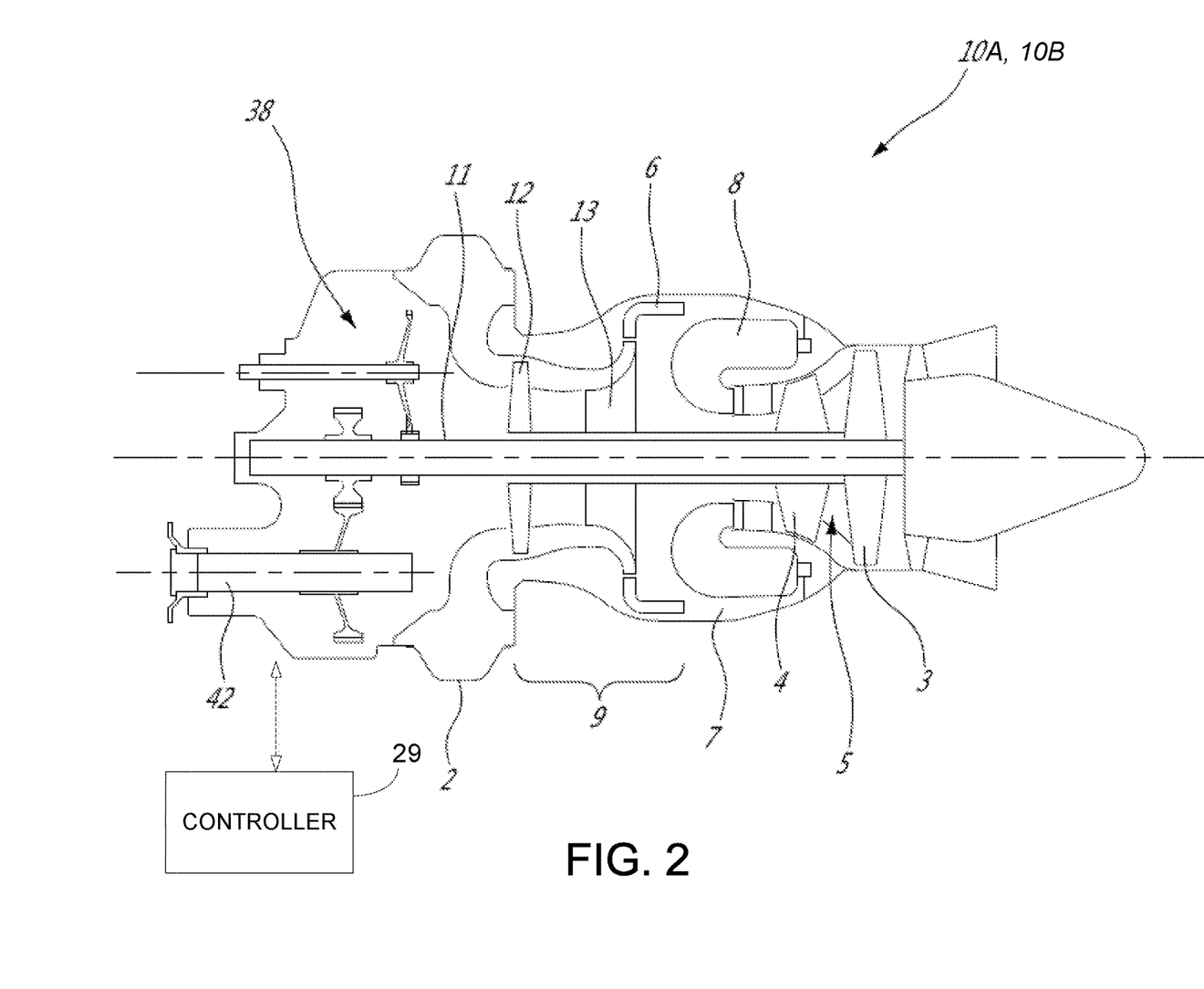
FIG. 2 is a schematic axial cross-sectional view of one of the gas turbine engines of FIG. 1B, for the multi-engine aircraft of FIG. 1A.

Referring now to FIG. 2, the gas turbine engine, 10A or 10B, is of a type provided, in one embodiment, for use in subsonic flight, generally comprising in serial flow communication a compressor section 9 for pressurizing the air, a combustor 8 in which the compressed air is mixed with fuel and ignited for generating an annular stream of hot combustion gases, and a turbine section 5 for extracting energy from the combustion gases. Engines 10A and 10B may be of a same or different configuration.

The engine 10A or 10B depicted in FIG. 2 is a turboshaft gas turbine engine, and therefore includes a reduction gearbox and transmission 38 with an output shaft 42 which is configured to provide power output from the engine 10A to the common aircraft gearbox 40 of the multi-engine system 50 of FIG. 1B. However, it is to be understood that the present disclosure may also be applicable to other types of gas turbine engines, including turboprops and turbofans for example.

Referring still to FIG. 2, the gas turbine engine 10A or 10B includes an air inlet 2 via which air enters the engine 10A or 10B before being directed into the compressor section 9 of the engine. In the depicted embodiment, the compressor section 9 includes a low-pressure axial compressor 12 and a high-pressure centrifugal compressor 13. Compressed air exits the high pressure compressor 13 through a diffuser 6 and is contained within a plenum 7 that surrounds the combustor 8. Fuel is supplied to the combustor 8 through fuel nozzles fed by a fuel system, wherein the injected fuel from the fuel nozzles is mixed with the compressed air within the combustor 8 thereby causing the fuel-air mixture to be ignited within the combustion chamber. A portion of the compressed air within the plenum 7 is therefore admitted into the combustor 8 through orifices in the side walls to create a cooling air curtain along the combustor walls. A portion of the compressed air is also is used as bleed air for pneumatic systems within and/or external to the engine. The annular stream of hot combustion gases exiting the combustor 8 is directed to a downstream turbine section 5 for extracting energy from the combustion gases before exiting the engine as exhaust. The turbine section 5 may include one or more turbine rotors. In the embodiment of FIG. 2, a high pressure turbine 4 drives a high pressure engine shaft to which both the low and high pressure compressors 12 and 13 are connected for driving same, and a low pressure turbine 3 drives a low pressure turbine shaft which is coaxial with the low pressure engine shaft and drives the power output shaft 11, and the gearbox 38, of the engine 10A or 10B.

Figure 3:
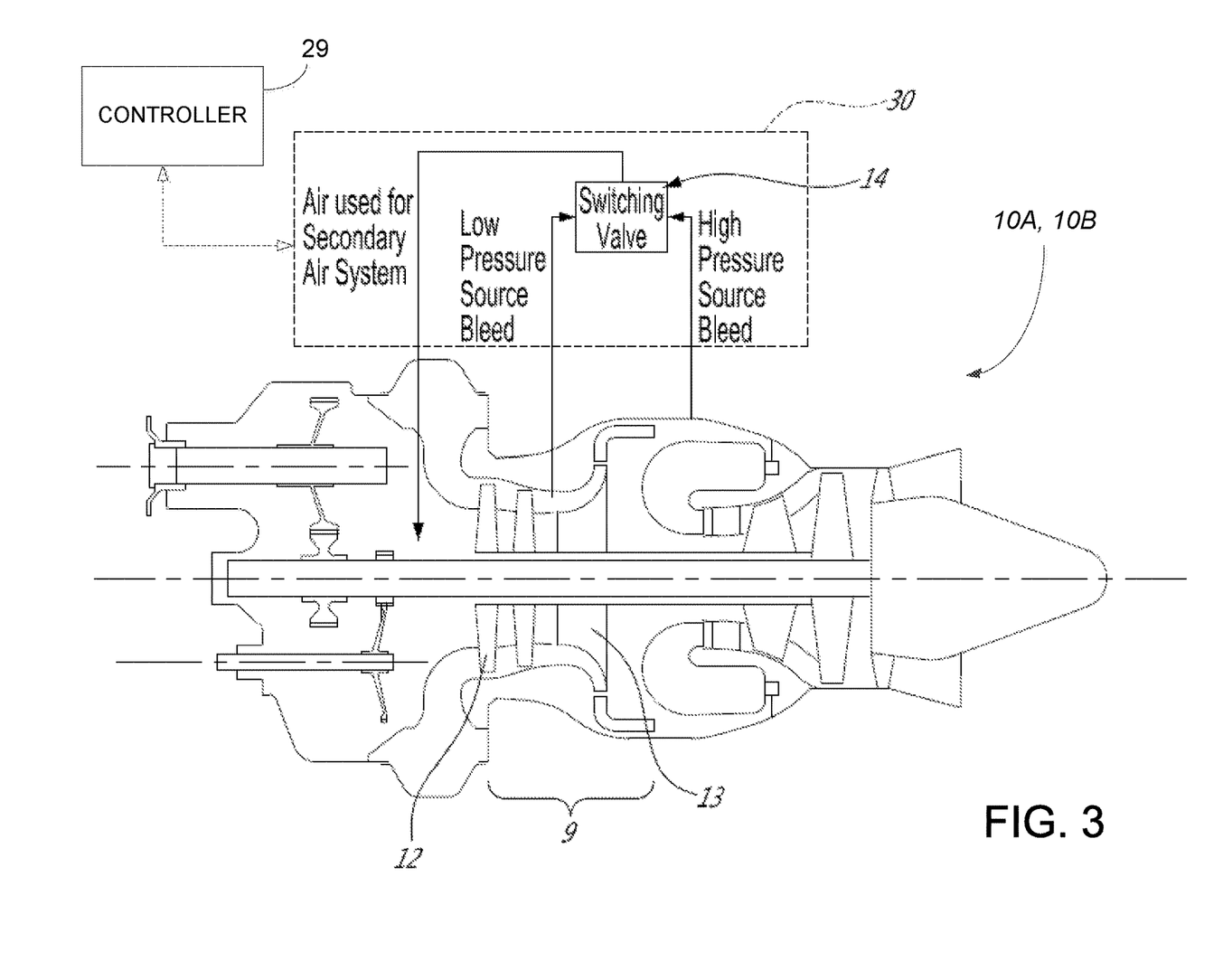
FIG. 3 is the schematic axial cross-sectional view of FIG. 2, showing an air switching system.
Figure 4:
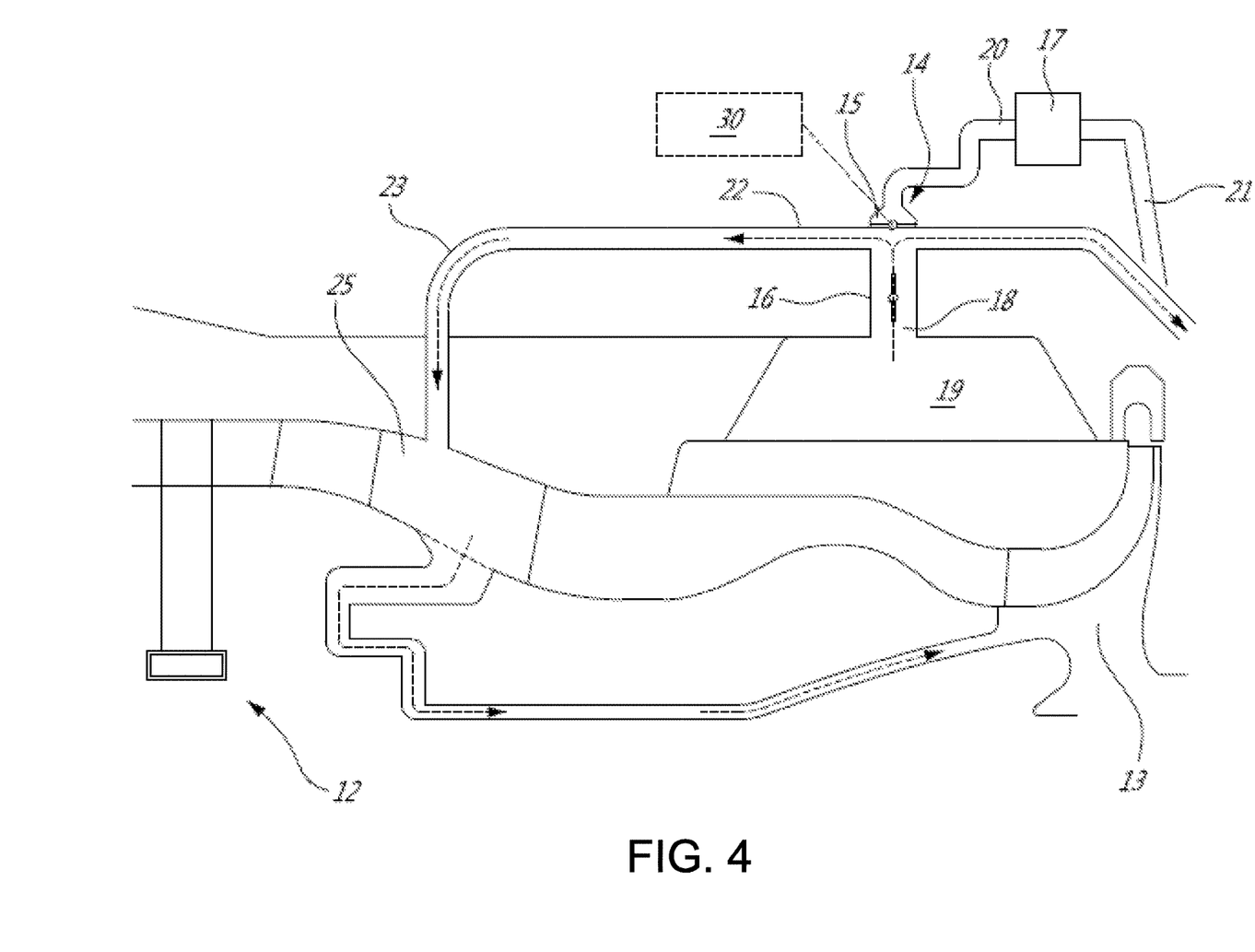
FIG. 4 is an enlarged axial cross-section view of the compressor section of the gas turbine engine of FIG. 2, showing the air system switching system of FIG. 3 operating in a first mode.
Figure 5:
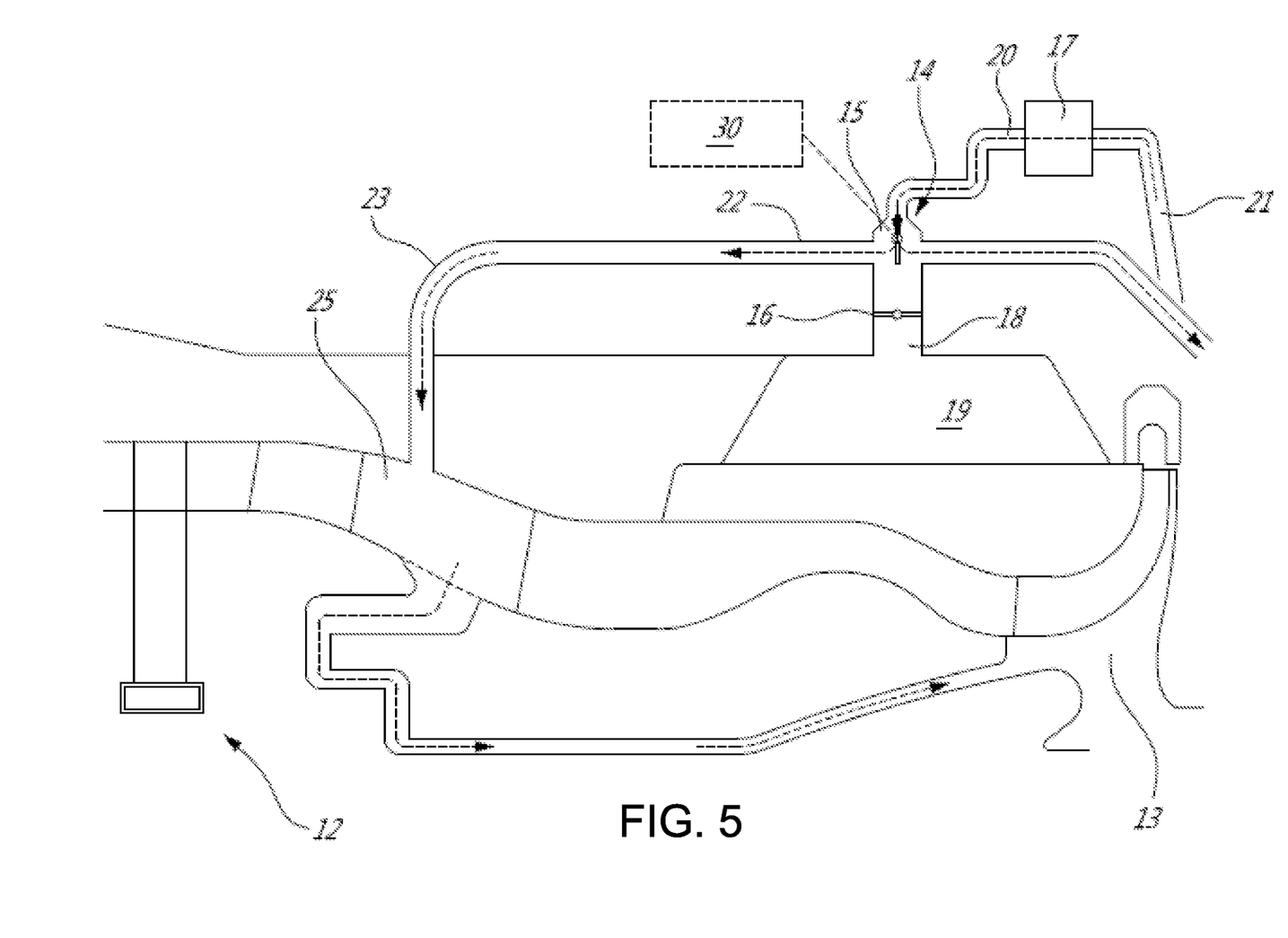
FIG. 5 is an enlarged axial cross-section view of the compressor section of the gas turbine engine of FIG. 2, showing the air system switching system of FIG. 3 operating in a second mode.

FIGS. 3-5 show axial sectional views of the compressor section 9 of the gas turbine engine 10A, 10B in particular the low pressure axial compressor(s) 12 and high pressure centrifugal compressor 13. While the exemplary embodiment includes an axial compressor and a centrifugal compressor, it is to be understood that other configurations (e.g. two or more axial compressors, two or more centrifugal compressors, a different combination of the two, etc.) is also possible.

At least one of the two engines 10A, 10B of the aircraft 1 has a compressed air switching system 30 that comprises and is in communication with a switching valve 14. The switching valve 14 may also be referred to herein as an "input selector switch" 14. The compressed air switching system 30 may be controlled by the engine control system, such as the controller 29 for example. In the example illustrated, the input selector switch 14 has three main components, namely, a manifold 15, a check valve 16, and a solenoid valve 17. The manifold 15 has a low pressure inlet 18 including the check valve 16 in communication with a low pressure air plenum 19. The manifold 15 has a high pressure inlet 20 including the solenoid valve 17 in communication with a high pressure air conduit 21, derived from the output of the high pressure centrifugal compressor 13. The manifold 15 conveys low or high pressure air via a manifold outlet 22 in communication with the bleed air system of the engine and aircraft.

In the example shown, the combination of the manifold 15, check valve 16, and solenoid valve 17 form the switching valve 14. Other configurations of switching valve 14 will be apparent to those skilled in the art, including a poppet valve, a sliding spool valve or a ball valve.

FIG. 4 shows the switching valve 14, and thus the compressed air switching system 30, in the active mode, where the solenoid valve 17 is closed and the check valve 16 is open, thereby connecting the low pressure inlet 18 and the switch outlet 22. In the active mode of FIG. 4, the low pressure air from the plenum 19 is provided through the manifold 15 into the switch outlet 22.

FIG. 5 shows the switching valve 14, and thus the compressed air switching system 30, in the standby mode, where the solenoid valve 17 is open and the check valve 16 is closed, thereby connecting the high pressure inlet 20 and the switch outlet 22. In the standby mode of FIG. 5, the high pressure air from the high pressure air conduit 21 is provided through the manifold 15 into the switch outlet 22.

As shown in FIG. 4, when the switching valve 14 is in the active mode, low pressure compressed air is provided to the bleed air system (i.e. the secondary air system) for an engine operation system via the switch outlet 22. Note that the positioning of the switching valve 14 as illustrated in FIG. 4 may also be applicable to other non-standby modes. A compressed air passage 23 from the switch outlet 22 leads to an engine shaft wherein the compressed air passage 23 passes through a stationary strut 25 within the gas path.

When the engine speed is lowered to a level at or below idle, such as during standby operation, the pressure of compressed air available from the low pressure plenum 19 may be insufficient for engine operations such as engine cooling and maintaining oil seals for the bearing cavities within the engine. In such sub-idle operations, the switching valve 14 is moved to the standby mode shown in FIG. 5 (i.e. solenoid valve 17 is open and the check valve 16 is closed). In the standby mode of FIG. 5, the high pressure air from the high pressure air conduit 21 is provided through the manifold 15 to the engine operating system to cool the turbines 11, and maintain oil seals with compressed air of sufficiently high pressure.

When the input selector switch 14 is in the active mode (or non-standby mode) of FIG. 4, the engine is operating in a normal flight condition at high power levels to provide a relatively high degree of motive power to the aircraft. During the active mode, a relatively high quantity of compressed bleed air is provided from the low pressure air plenum 19. The bleed air in the active mode is provided to the aircraft operation system at sufficient pressure and quantity for aircraft functions such as cabin pressurization, engine starting, pneumatic systems etc. as well as for the engine operating system to maintain engine functions such as cooling the turbines 11 and maintaining oil seals.

When the switching valve is in the standby mode of FIG. 5, a relatively low degree of motive power, or substantially no motive power, is provided to the aircraft and a relatively low quantity of aircraft bleed air is provided for the aircraft operation requirements.

When it is desired for an engine that is operating in standby mode, such as engine 10A, to return to a non-standby mode (which may be an active mode or may be a regular operation mode), the compressed air switching system 30 may be operated to ensure proper secondary air system operation, which in some instances means proper sealing and cooling of cavities of the engine. Indeed, when the engine 10A is operating in standby mode as per FIG. 5, pressure at a first level, which would normally be only providing sealing in so-called "high pressure" cavities when in normal operation, is sent to lower pressure cavities. This is acceptable when the engine 10A is operating in standby mode because the high pressure source bleed is lower than during normal operation and equivalent to a low pressure source bleed that is used to seal the low pressure cavities. For example, "P3" pressure is used instead of "P2.8" pressure when the engine 10A is operated in standby mode.

When returning the standby engine to a non-standby mode, the air switching system 30 is gradually transitioned back to a higher pressure level. The pressure and/or temperature gradient between the power level in standby mode and the power level in non-standby mode may be so great that it would shock the seals if the transition were direct instead of gradual.

In some embodiments, a gradual transition is achieved using torque motors or stepper motors. The torque motors or stepper motors are actuated so as to gradually open one or more valves, such that the pressure and/or temperature is progressively increased with the gradual increase of the one or more valves.

In some embodiments, the gradual transition is achieved by applying pulse width modulation (PWM) to the air switching system, for example to a solenoid valve such as solenoid valve 17. By performing PWM on the air switching system, the pressure and temperature can be slowly reverted back to a normal operating condition state.

The solenoid valve 17 is in electric communication with a control system, such as controller 29. The controller 29 communicates a modulated pulse to the solenoid actuated valve 17 consisting of a plurality of sequentially alternating open and close signals, thus causing the valve 17 to alternate between an opened position and a closed position over a given duration of time. The duration of each valve position and the number of open and close cycles applied to the valve 17 are controlled by the controller 29. The PWM causes a gradual increase of pressure and/or temperature within the engine.

Figure 6:
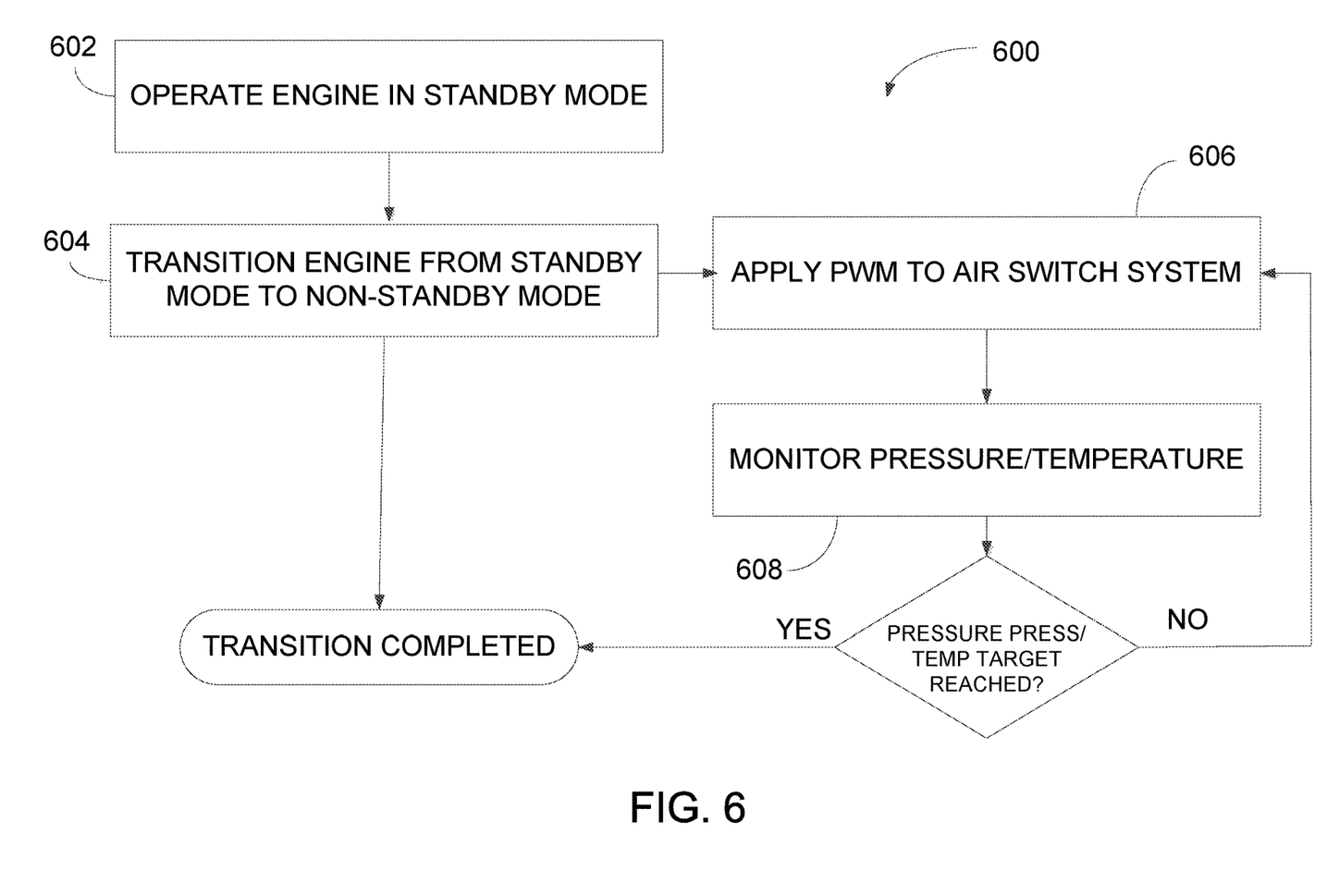
FIG. 6 is a flowchart of an example method of operating an engine in a multi-engine aircraft.

Referring to FIG. 6, there is illustrated a flowchart of an example method for operating a gas turbine engine in a multi-engine aircraft. At step 602, the gas turbine engine is operated in the standby mode. As stated above, this is understood to mean that the gas turbine engine provides substantially little or no motive power to the aircraft, and the aircraft is operating in an asymmetric operating regime whereby at least one other engine of the aircraft is operated in an active mode to provide motive power to the aircraft. In addition, the air switching system 30 of the engine is positioned to bleed high pressure air into low pressure cavities.

At step 604, the engine is transitioned from the standby mode to a non-standby mode, for example by increasing fuel flow to accelerate the gas turbine engine. Transitioning out of the standby mode may include other actions, such as displacing one or more guide vane and/or changing a propeller blade angle. Transition of the engine from the standby to the non-standby mode may be triggered, for example, upon receipt of a request to transition the engine from the standby mode to the non-standby mode. The request may be a manual request or a system-generated requested. For example, the request may be received from an aircraft operator such as the pilot through a cockpit input. The request may be received from an engine system, for example in response to detecting circumstances requiring a higher power level from the engine operating in standby mode. The request may be received from an aircraft system, for example in response to detecting circumstances requiring that the engines exit the asymmetric operating regime. The request to exit the asymmetric operating regime may also come from an engine system or be generated manually.

The request may be a normal level request, an emergency level request, or any other suitable level for a request of this nature. In some embodiments, only normal level requests would trigger a gradual transition from the standby mode to the non-standby mode, as the duration of the transition may be increased in such circumstances.

At step 606, pulse width modulation is applied to the air switching system of the transitioning engine. Although illustrated as being triggered after step 604, step 606 may also be triggered concurrently with step 604. For example, in response to a request to transition the engine from the standby mode to a non-standby mode, steps 604 and 606 are both triggered. Alternatively, the transition begins at step 604 and an action or task performed during the transition from standby mode to non-standby mode triggers application of PWM to the air switching system, as per step 606.

In some embodiments, pressure and/or temperature of the engine is monitored as the engine is transitioned from standby mode to non-standby mode, at step 608. In some embodiments, application of the PWM to the air switching system triggers the monitoring at step 608. In other embodiments, an action or task performed during the transition from standby mode to non-standby mode at step 604 triggers the monitoring of the pressure and/or temperature at step 608. In yet other embodiments, pressure and/or temperature is already monitored, and the method 600 merely uses the measurements at step 608.

The measurements of pressure and/or temperature may be used to determine if the pressure and/or temperature of the engine transitioning from standby to non-standby mode has reached a desired target. In some embodiments, PWM is no longer applied to the air switching system when the desired target has been reached. In some embodiments, the pressure and/or temperature measurements are used to adapt or modify the PWM in real-time, for example by changing a duration of each valve position, and/or a number of PWM cycles applied and/or a duration of a PWM cycle. The parameters used for PWM may also be predetermined, for example using tests, simulations, and/or modeling techniques.

Figure 7:
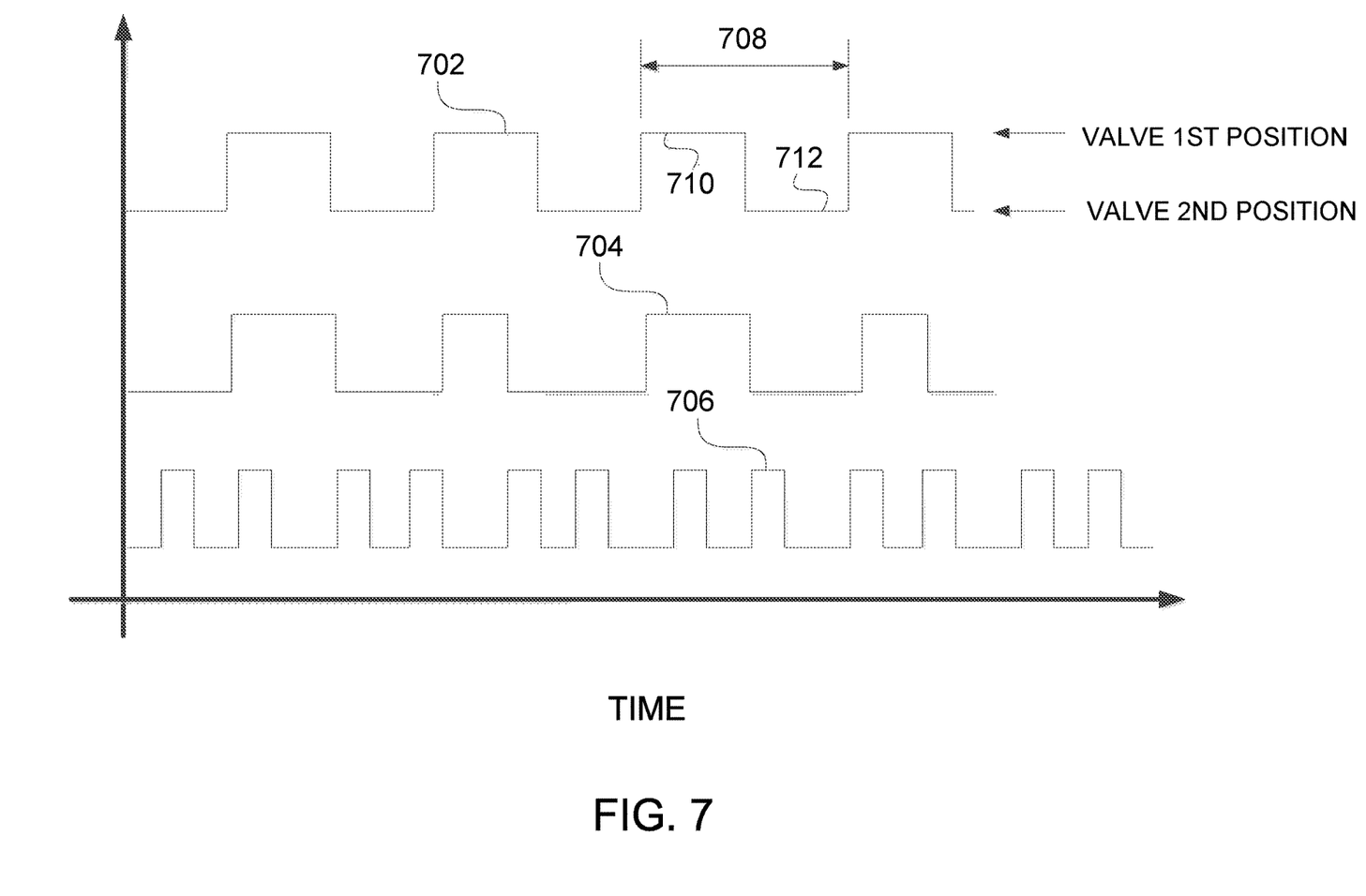
FIG. 7 illustrates examples of pulse width modulation signals for application to the air switching system of FIG. 3.

Referring to FIG. 7, there is illustrated a plurality of example PWM signals 702, 704, 706 which may be applied to the air switching system of the engine as it transitions from the standby mode to the non-standby mode. Each signal 702, 704, 706 is composed of one or more PWM cycle 708 having a high 710 and a low 712 value. When the signal is high, the valve is instructed to move to its first position (for example open) and when the signal is low, the valve is instructed to move to its second position (for example closed). Each PWM cycle 708 may have a given duration (or period) that varies or remains for the duration of the signal. The duration of a high position 710 may be the same or different as the duration of a low position 712 for any given PWM cycle 708 and from one PWM cycle 708 to another. The duration of the PWM signal 702, 704, 706 may be predetermined or may be determined in real-time using feedback from one or more pressure and/or temperature sensor.

Figure 8:
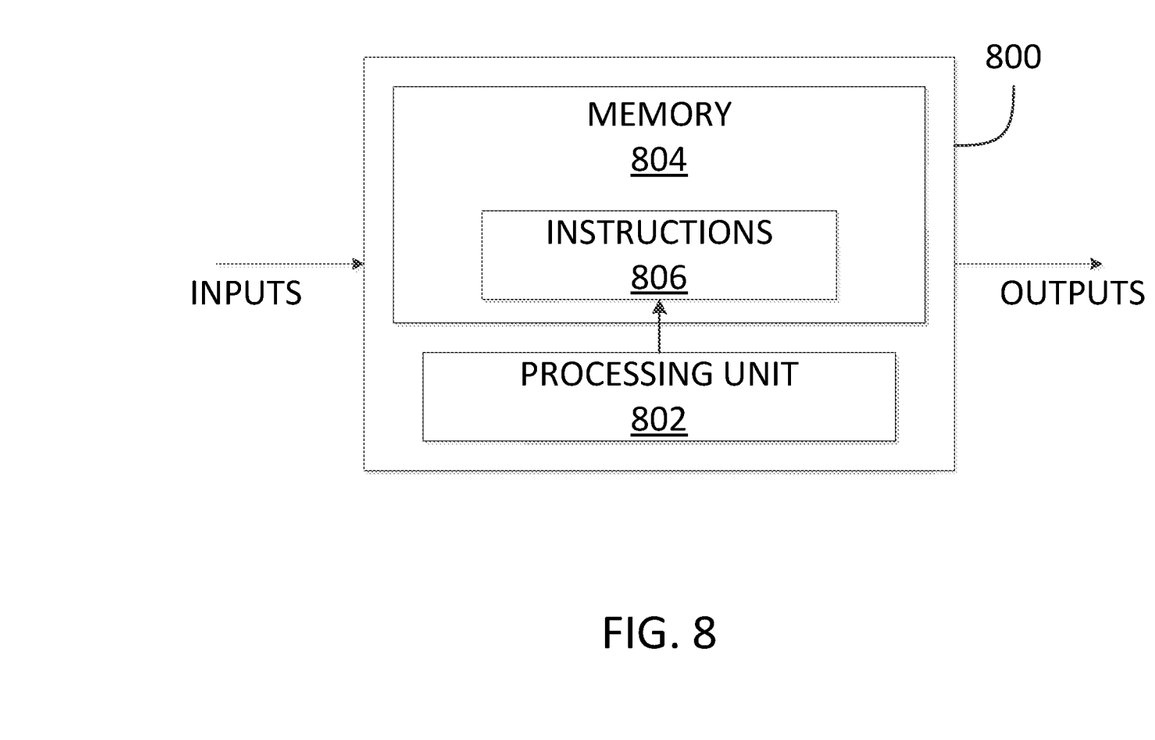
FIG. 8 is a block diagram of an example computing device for implementing the method of FIG. 6.

With reference to FIG. 8, the method 600 may be implemented by a computing device 800 as an embodiment of the controller 29. The computing device 800 comprises a processing unit 802 and a memory 804 which has stored therein computer-executable instructions 806. The processing unit 802 may comprise any suitable devices configured to implement the functionality of the controller 29 such that instructions 806, when executed by the computing device 800 or other programmable apparatus, may cause the functions/acts/steps performed by the controller 29 as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems for operating engines in a multi-engine aircraft as described herein may be implemented in a high level procedural or object oriented programming or scripting language, or a combination thereof, to communicate with or assist in the operation of a computer system, for example the computing device 800. Alternatively, the methods and systems for operating engines in a multi-engine aircraft may be implemented in assembly or machine language. The language may be a compiled or interpreted language.

Embodiments of the methods and systems for operating engines in a multi-engine aircraft may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein, for example those described in the method 600.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

In particular embodiments, the present disclosure includes supplying "P2.X" air to pressurize seals of a gas turbine engine when the engine is operating in a standby mode to provide substantially no motive power to an aircraft, when at least one other engine of the aircraft is operated in an active mode to provide motive power to the aircraft. When the engine is transitioned from the standby mode to a non-standby mode, the air switching system is gradually transitioned to a higher pressure source, for example by having "P3" air supplied to pressurize the seals previously pressurized by "P2.X" air. An air switching system for a secondary air system of the gas turbine engine may include a solenoid operated shut off valve, which actuates to switch between first and second bleed air sources, and a check valve.

The solenoid valve can be opened and closed, to respectively permit or block higher pressure air (e.g. "P3" air) from being directed to the compressor cavities for cooling and/or sealing purposes. When the engine is operating in a standby mode with a lower power/speed range (e.g. a "sub-idle" operation as described herein), the solenoid valve is open and the check valve is closed, thereby forcing the higher pressure P3 air to be fed to the compressor cavities for sealing and/or cooling purposes. When the engine is transitioned out of the standby mode to a non-standby mode (such as an active mode or a regular operation mode), PWM is applied to the air switching system to gradually increase pressure and/or temperature of the engine to its regular operating state.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a gas turbine engine in a multi-engine aircraft, the method comprising:
operating the gas turbine engine in a standby mode to provide substantially no motive power to the aircraft when another engine of the multi-engine aircraft is operated in an active mode to provide motive power to the aircraft;

when the gas turbine engine is operating in the standby mode, supplying compressed air to a secondary air system from a first location along a gas path of the gas turbine engine via a solenoid valve;

transitioning the gas turbine engine from the standby mode to the active mode;

when the gas turbine engine is transitioning from the standby mode to the active mode:
increasing a pressure of the compressed air at the first location along the gas path;
supplying compressed air to the secondary air system from the first location; and
applying pulse width modulation to the solenoid valve to gradually increase a pressure of the compressed air supplied to the secondary air system from the first location; and when the gas turbine engine is operating in the active mode, supplying compressed air to the secondary air system from a second location along the gas path of the gas turbine engine while the solenoid valve is closed, the second location being upstream of the first location along the gas path.

2. The method of claim 1, further comprising monitoring at least one of pressure or temperature of a working fluid in the gas turbine, while applying pulse width modulation to the solenoid valve.

3. The method of claim 2, wherein applying the pulse width modulation comprises adapting the pulse width modulation in real-time based on the at least one of pressure or temperature of the working fluid in the gas turbine as monitored.

4. The method of claim 3, wherein adapting the pulse width modulation comprises determining a duration of the pulse width modulation.

5. The method of claim 3, wherein adapting the pulse width modulation comprises determining a duration of time the solenoid valve stays in a first position and a second position for each cycle of a pulse width modulation signal.

6. The method of claim 1, wherein the pulse width modulation is applied to the solenoid valve in response to a request to exit an asymmetric mode of operation of the engine.

7. A system for operating a gas turbine engine in a multi-engine aircraft, the system comprising:
a processing unit; and
a non-transitory storage medium having stored thereon program code executable by the processing unit for:

operating the gas turbine engine in a standby mode to provide substantially no motive power to the aircraft when another engine of the multi-engine aircraft is operated in an active mode to provide motive power to the aircraft;

when the gas turbine engine is operating in the standby mode, supplying compressed air to a secondary air system from a first location along a gas path of the gas turbine engine via a solenoid valve;

transitioning the gas turbine engine from the standby mode to the active mode;

when the gas turbine engine is transitioning from the standby mode to the active mode:
increasing a pressure of the compressed air at the first location along the gas path;
supplying compressed air to the secondary air system from the first location; and
applying pulse width modulation to the solenoid valve to gradually increase a pressure of the compressed air supplied to the secondary air system from the first location; and when the gas turbine engine is operating in the active mode, supplying compressed air to the secondary air system from a second location along the gas path of the gas turbine engine while the solenoid valve is closed, the second location being upstream of the first location along the gas path.

8. The system of claim 7, wherein the program code is further executable for monitoring at least one of pressure or temperature of a working fluid in the gas turbine, while applying pulse width modulation to the solenoid valve.

9. The system of claim 8, wherein applying the pulse width modulation comprises adapting the pulse width modulation in real-time based on the at least one of pressure or temperature of the working fluid in the gas turbine as monitored.

10. The system of claim 9, wherein adapting the pulse width modulation comprises determining a duration of the pulse width modulation.

11. The system of claim 9, wherein adapting the pulse width modulation comprises determining a duration of time the solenoid valve stays in a first position and a second position for each cycle of a pulse width modulation signal.

12. The system of claim 7, wherein the pulse width modulation is applied to the solenoid valve in response to a request to exit an asymmetric mode of operation of the engine.

* * * * *